(12) United States Patent  (10) Patent No.: US 9,068,582 B2
Wolbert et al.  (45) Date of Patent: Jun. 30, 2015

(54) BANDING SYSTEM FOR INSULATION

(71) Applicant: Transco Products Inc., Chicago, IL (US)

(72) Inventors: Edward J. Wolbert, Lisle, IL (US); Kevin J. Hawks, Ottawa, IL (US)

(73) Assignee: Transco Products Inc., Chicago, IL (US)

( * ) Notice: Subject to any disclaimer, the term of this patent is extended or adjusted under 35 U.S.C. 154(b) by 254 days.

(21) Appl. No.: 13/897,549

(22) Filed: May 20, 2013

(65) Prior Publication Data

US 2013/0312864 A1 Nov. 28, 2013

Related U.S. Application Data

(60) Provisional application No. 61/650,579, filed on May 23, 2012.

(51) Int. Cl.
| F16L 9/14 | (2006.01) |
| F16B 2/08 | (2006.01) |
| F16L 59/14 | (2006.01) |
| F16L 59/02 | (2006.01) |
| F16L 33/12 | (2006.01) |

(52) U.S. Cl.
CPC . *F16B 2/08* (2013.01); *F16L 59/14* (2013.01); *Y10T 24/1459* (2015.01); *F16L 59/022* (2013.01); *F16L 33/12* (2013.01)

(58) Field of Classification Search
CPC .......... F16B 2/08; F16L 33/12; F16L 59/022; F16L 59/14; Y10T 24/1459; Y10T 24/1465

USPC ......... 138/148, 147, 158, 163; 24/21; 285/23, 285/236, 404, 90
See application file for complete search history.

(56) References Cited

U.S. PATENT DOCUMENTS

| 230,313 | A | * | 7/1880 | McLaughlin | 24/21 |
| 589,903 | A | * | 9/1897 | Lysle | 138/158 |
| 814,608 | A | * | 3/1906 | Johnson | 24/271 |
| 1,183,285 | A | * | 5/1916 | Englund | 24/272 |
| 1,847,475 | A | * | 3/1932 | Donald | 24/271 |

(Continued)

FOREIGN PATENT DOCUMENTS

| CN | 103423550 A | 12/2013 |
| GB | 1404256 A | 8/1975 |

OTHER PUBLICATIONS

Aspen Aerogels, "Data Sheet for Pyrogel 2250, Flexible Insulation for High Temperatures", copyright 2008, rev. 2.0 (2 pages).

(Continued)

*Primary Examiner* — Patrick F Brinson
(74) *Attorney, Agent, or Firm* — Nixon Peabody LLP

(57) ABSTRACT

An insulation system has an insulation. A metal jacket is disposed about the insulation. The metal jacket has opposing free ends. A circumferential retaining band is disposed about the metal jacket and has a longitudinal length substantially less than a corresponding length of the metal jacket. The circumferential retaining band has a coupler joining a first end of the circumferential retaining band to an opposing second end of the circumferential retaining band and a clip spaced from the coupler along a radially inner surface of the retaining band. The clip is adapted to secure the opposing free ends of the metal jacket.

20 Claims, 10 Drawing Sheets

(56) References Cited

U.S. PATENT DOCUMENTS

| | | | |
|---|---|---|---|
| 2,258,176 A * | 10/1941 | Denning | 138/158 |
| 2,821,004 A * | 1/1958 | Romano | 24/273 |
| 2,869,211 A * | 1/1959 | Kessler et al. | 24/270 |
| 3,759,008 A | 9/1973 | Husz | |
| 3,818,949 A | 6/1974 | Johnson | |
| 3,879,910 A | 4/1975 | Waite | |
| 3,882,382 A | 5/1975 | Johnson | |
| 3,929,207 A | 12/1975 | Urban | |
| RE28,930 E | 8/1976 | Johnson | |
| 4,073,317 A * | 2/1978 | Ellis | 138/147 |
| 4,081,938 A | 4/1978 | Bertacchi et al. | |
| 4,100,711 A | 7/1978 | Skuran | |
| 4,207,918 A | 6/1980 | Burns et al. | |
| 4,244,269 A | 1/1981 | Gorell | |
| 4,250,678 A | 2/1981 | Skuran | |
| 4,251,598 A | 2/1981 | Waite | |
| 4,323,088 A * | 4/1982 | McClellan | 138/106 |
| 4,436,119 A | 3/1984 | Shahan et al. | |
| 4,530,478 A * | 7/1985 | McClellan | 248/62 |
| 4,660,870 A * | 4/1987 | Donley | 285/419 |
| 4,878,459 A * | 11/1989 | Nelson | 122/19.2 |
| 5,304,408 A | 4/1994 | Jarosz et al. | |
| 5,334,806 A | 8/1994 | Avery | |
| 6,863,312 B1 * | 3/2005 | Liebst | 285/23 |
| 7,168,452 B2 * | 1/2007 | Sasaki et al. | 138/110 |
| 7,947,354 B2 | 5/2011 | Pirogovsky et al. | |
| 2006/0058157 A1 | 3/2006 | Greiner et al. | |
| 2006/0240215 A1 | 10/2006 | Whaley | |
| 2007/0289974 A1 | 12/2007 | Blair et al. | |

OTHER PUBLICATIONS

Aspen Aerogels; "Data Sheet for Pyrogel XT, Flexible Industrial Insulation for High-Temperature Applications," copyright 2008, rev. 5.1 (2 pages).

\* cited by examiner

BANDING SYSTEM FOR INSULATION

CROSS-REFERENCE TO RELATED APPLICATIONS

This present application claims the benefit of U.S. Provisional Patent Application No. 61/650,579 filed May 23, 2012, and which the contents of are incorporated herein by reference.

FEDERALLY SPONSORED RESEARCH OR DEVELOPMENT

N/A

FIELD OF THE INVENTION

The present invention relates generally to jacketing for thermal insulation systems and more specifically to the use of a high-strength banding system for jacketing on thermal insulation systems used in nuclear power plants.

BACKGROUND

All nuclear power plants have some form of emergency core cooling system (ECCS). In the event that normal operation is lost, a major break can occur in the reactor coolant system. This is generally referred to as a loss of coolant accident (LOCA). There are two phases to most ECCS—the injection phase when the pumps suction water from a large tank and pump that water to spray the general primary containment area, or directly into the reactor coolant system or reactor, and the recirculation phase when the pumps take water from the containment sump after all of the available water inventory in the storage tanks has been pumped into the containment.

An ECCS has one major function and that is to provide makeup water to cool the reactor in the event of a LOCA from the reactor coolant system. This cooling is needed to remove the heat in the reactor's core, allowing to reactor to achieve a state of safe cold shutdown.

The major components of an ECCS are pumps, interconnecting piping, high pressure pumps, low pressure pumps, water storage tanks, accumulators, and a containment sump used to circulate the water through the reactor once the storage tanks are empty.

In a nuclear power plant, a suction strainer is located in the containment area, and its purpose is to keep loose materials and debris, such as insulation, from getting to the suction of the ECCS pumps during the recirculation phase. The pumps perform an important and vital function at nuclear power plants. Again, a purpose of the strainers is to protect the downstream components, such as pumps and nuclear fuel assemblies, from being adversely affected by such debris. Suction strainers, by their nature, have a tendency to build up debris layers. In use, as water is circulated through the strainer, solid debris builds on the outer surfaces of the strainer. The recirculation generally continues until the ECCS is no longer needed in cold shutdown.

Since the ECCS system may need to function for many hours, days and even weeks, it is important to ensure that the suction strainers continue to allow flow through the ECCS system; therefore, it is equally important that the amount of debris reaching those suction strainers is minimized to ensure continued operability.

Fibrous, block and blanket-type insulations are frequently used in power plants to conserve thermal energy within the insulated piping or equipment during normal operation. In many situations, the insulation is covered by removable/reusable stainless steel jacketing that uses latches for attachment.

These insulation systems are not immune from damage and can disintegrate under impact from a LOCA. This could cause undesirable release of insulation debris which could adversely affect the performance of the ECCS. Destruction of thermal insulation can be considerably reduced when it is encapsulated by stainless steel jackets, and when that stainless steel jacketing itself is not dislodged. It is, therefore, important to maintain the stainless steel jacketing around the insulation when a LOCA occurs to reduce the generation of debris and limit the transportation of this same debris to the suction strainer.

Jacketing is typically installed with attachment hardware such as screws or blind rivets. Jacketing may also be secured by banding with latches or other retaining methods. However, banding is typically installed as a component that is separate and distinct from the jacketing system. During a severe accident in a nuclear power plant, such as a LOCA, the destructive forces from escaping saturated steam and water can cause the jacketing to deform underneath the banding. With no fixing arrangement between the jacketing and the banding, the jacketing, and subsequently the underlying insulation, can be destroyed. Banding can be attached to the jacketing by screws or blind rivets, but these negate the removability feature of the jacket needed for plant personnel to remove and replace insulation for inspections and maintenance on a regular basis.

The present invention is provided to solve the problems discussed above. A full discussion of the features and advantages of the present invention is deferred to the following detailed description, which proceeds with reference to the accompanying drawings.

SUMMARY OF THE INVENTION

One aspect of the present invention is directed to a retaining band for securing a metal jacket about an insulation. The retaining band comprises a metal strip, a coupler, and a clip. The metal strip has opposing first and second ends and is formed into an annular structure such that the first and second ends are drawn together. The coupler secures the first and seconds to form the annular structure. The clip retains an edge portion of the metal jacket therein and is located along a radially inner wall of the annular structure.

The first aspect of the present invention optionally includes one or more of the following features, alone or in any reasonable combination. The clip may be fixedly attached to the inner wall of the annular structure. The clip may comprise a first leg extending along the radially inner surface of the annular retaining band which terminates at a first bend which directs the clip radially inwardly and in an opposite direction to form a first pocket adapted for receiving a first edge of an end portion of a metal jacket. The clip may comprise a second leg extending from the first bend in a direction opposite the first leg which terminates at a second bend which directs the clip radially inwardly and in an opposite direction to form a second pocket adapted for receiving a second edge of an opposing end portion of the metal jacket. The coupler may be a tension latch. The clip may be hook-shaped. The clip may be S-shaped. The insulation may be a blanket insulation having an insulating core sandwiched between an outer fabric layer and an inner fabric layer Another aspect of the present invention is directed to an insulation system. The system comprises a pipe insulation, a metal jacket, and an annular retaining band. The metal jacket is disposed about the pipe and has opposing free ends. The annular retaining band is disposed about the metal jacket and has a longitudinal length substantially less than a corresponding longitudinal length of the metal jacket. The annular retaining band includes a coupler joining a first end of the annular retaining band to an opposing second end of the annular retaining band and a clip spaced from the coupler along a radially inner surface of the retaining band wherein the clip is adapted to secure the opposing free ends of the metal jacket.

This aspect of the present invention optionally includes one or more of the following features, alone or in any reasonable combination. The clip may extend radially inwardly from the radially inner surface of the annular retaining band. The clip may comprise a first leg extending along the radially inner surface of the annular retaining band and terminating at a first bend which directs the clip radially inwardly and in an opposite direction to form a first pocket wherein one of the opposing ends of the metal jacket is inserted within the first pocket. The clip may comprise a second leg extending from the first bend in a direction opposite the first leg and terminating at a second bend which directs the clip radially inwardly and in an opposite direction to form a second pocket wherein one of the opposing ends of the metal jacket is inserted within the second pocket. The clip may be spaced from the coupler between 30 and 330 degrees. The clip may be spaced from the coupler between 90 and 270 degrees. The clip may be spaced from the coupler between 120 and 240 degrees. The clip may be spaced from the coupler between 150 and 210 degrees. The coupler may be a tension latch. The clip may be hook-shaped. The clip may be S-shaped. The insulation may be a blanket insulation comprising an insulating core, an outer layer of a fabric, an inner layer of a fabric, a pair of opposing end layers of a fabric, and a plurality of fasteners located adjacent the opposing end layers for drawing the pair of end layers together forming a substantially tubular arrangement.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
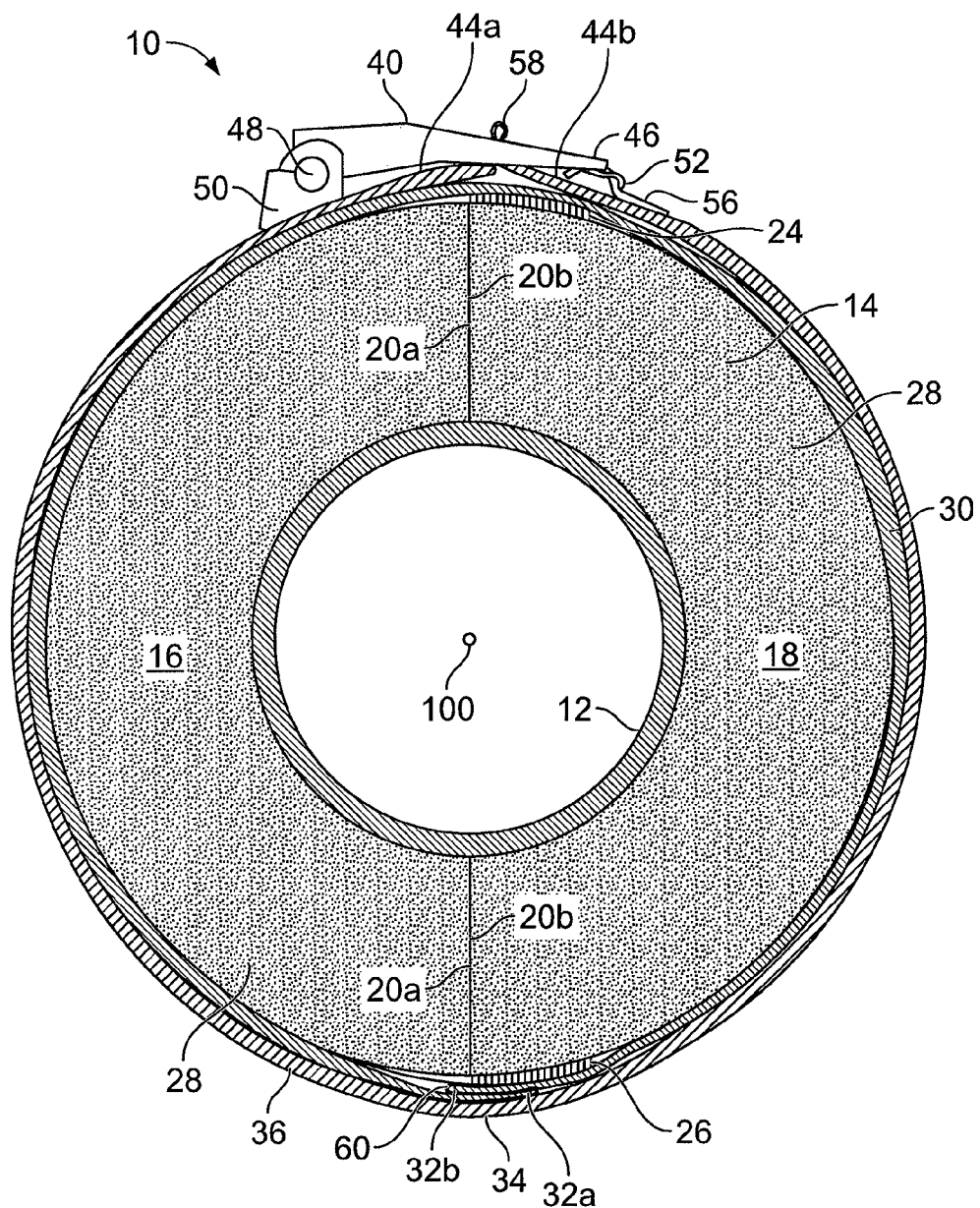
FIG. 1 is a transverse cross-sectional view shown schematically of an insulation system including a retaining band.
Figure 2:
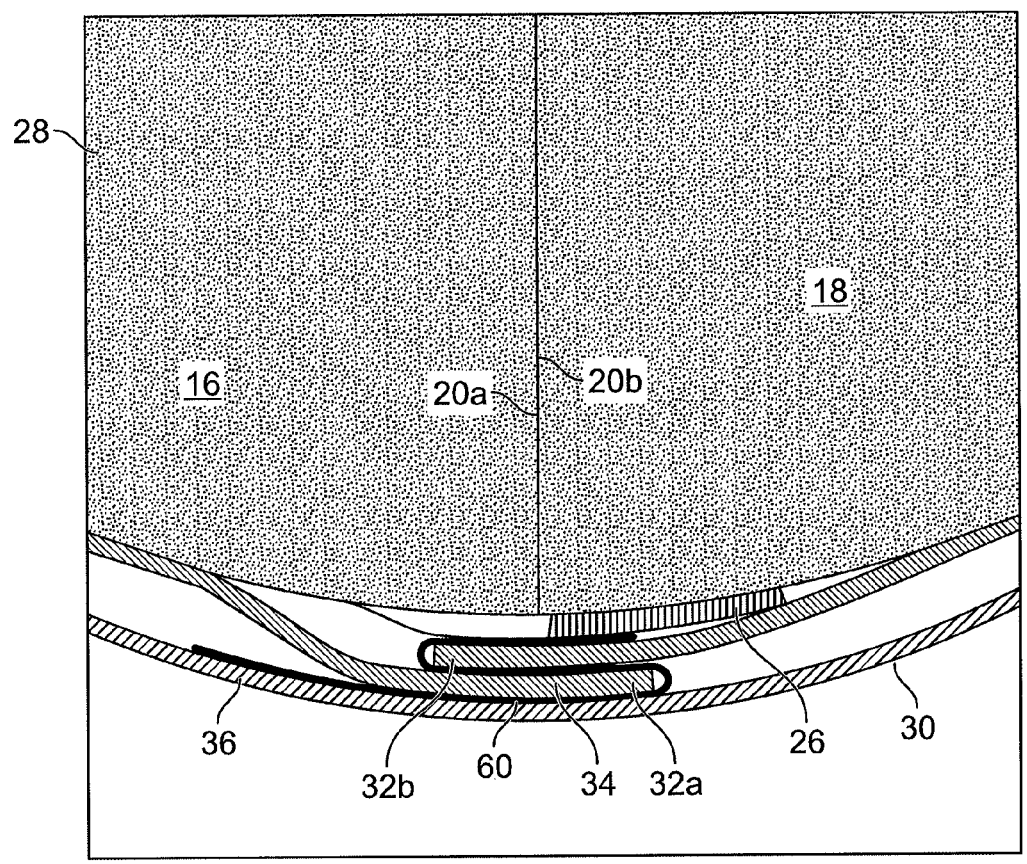
FIG. 2 is a magnified portion of the schematic representation of FIG. 1.
Figure 3:
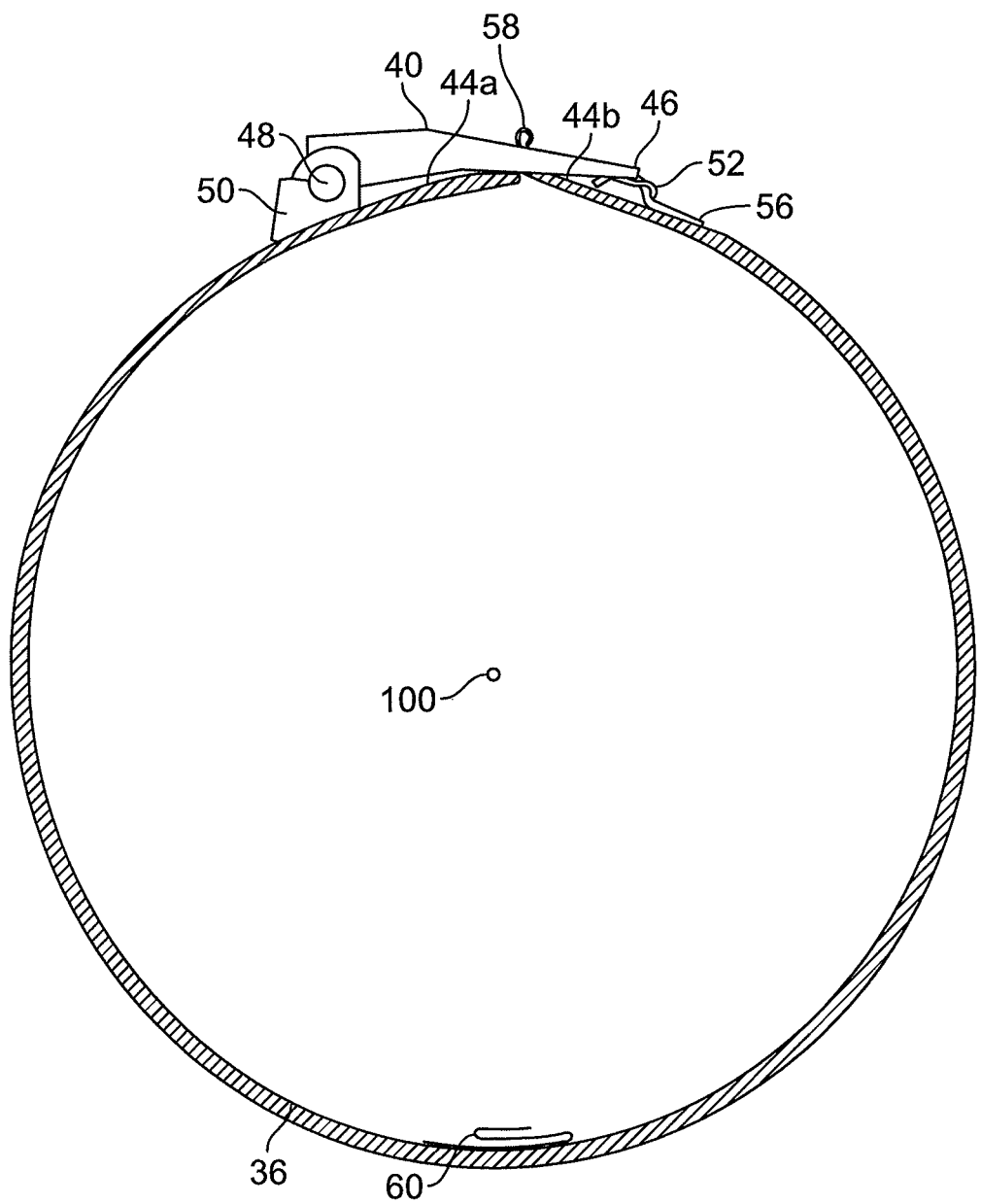
FIG. 3 is a side view of a retaining band of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

An insulation system made in accordance with the teaching of the present invention is shown in FIG. 1 by the general reference number 10. The insulation system 10 of the present invention includes a service pipe 12 having an insulation 14 wrapped about an outer circumference. The insulation can be any insulation type used to insulate a pipe; however, in the application in which the invention is incorporated, the insulation is typically a low-density fiberglass insulation, and more typically a blanket insulation.

In the embodiment illustrated, a blanket 14 is constructed of two (2) halves, a right blanket portion 16 and a left blanket portion 18. The two blanket portions 16,18 are mated or placed in confronting relationship with butt surfaces 20a,b preferably abutting one another as illustrated on the blanket 14 illustrated in FIG. 1.

The blanket 14 has an outer fabric or skin, an inner fabric or skin, and a butt-end fabric or skin sandwiching and encapsulating the insulating core. The fabric/skin is sewn together. A plurality of tuft supports is sewn into the blanket 14 to enhance the structural integrity of the blanket 14 and prevent shifting. A plurality of fasteners 24,26 is employed to secure the blanket in place around the service pipe 12. A hook and loop fastener system is illustrated; however, it is recognized by those of ordinary skill in the art that D-rings and straps, laces, or other fasteners can be provided.

Alternatively, rather than tuft supports sewn into the blanket, a layer of fiberglass scrim cloth may be provided for structural integrity instead of tufting.

As noted, once the blanket 14 halves 16,18 are put around the object to be insulated, the butt ends 20a,b of the blanket 14 are pressed against one another in abutting relationship and the fasteners 24,26 are mated and locked to ensure the blanket 14 stays in its desired location and position.

It should be noted that preferably all hardware associated with the blankets 14 of the present invention (such as tags, hooks, D-rings, etc.) are made of stainless steel and the threading used to sew/stitch the blankets is fiberglass or similar material.

Figure 4:
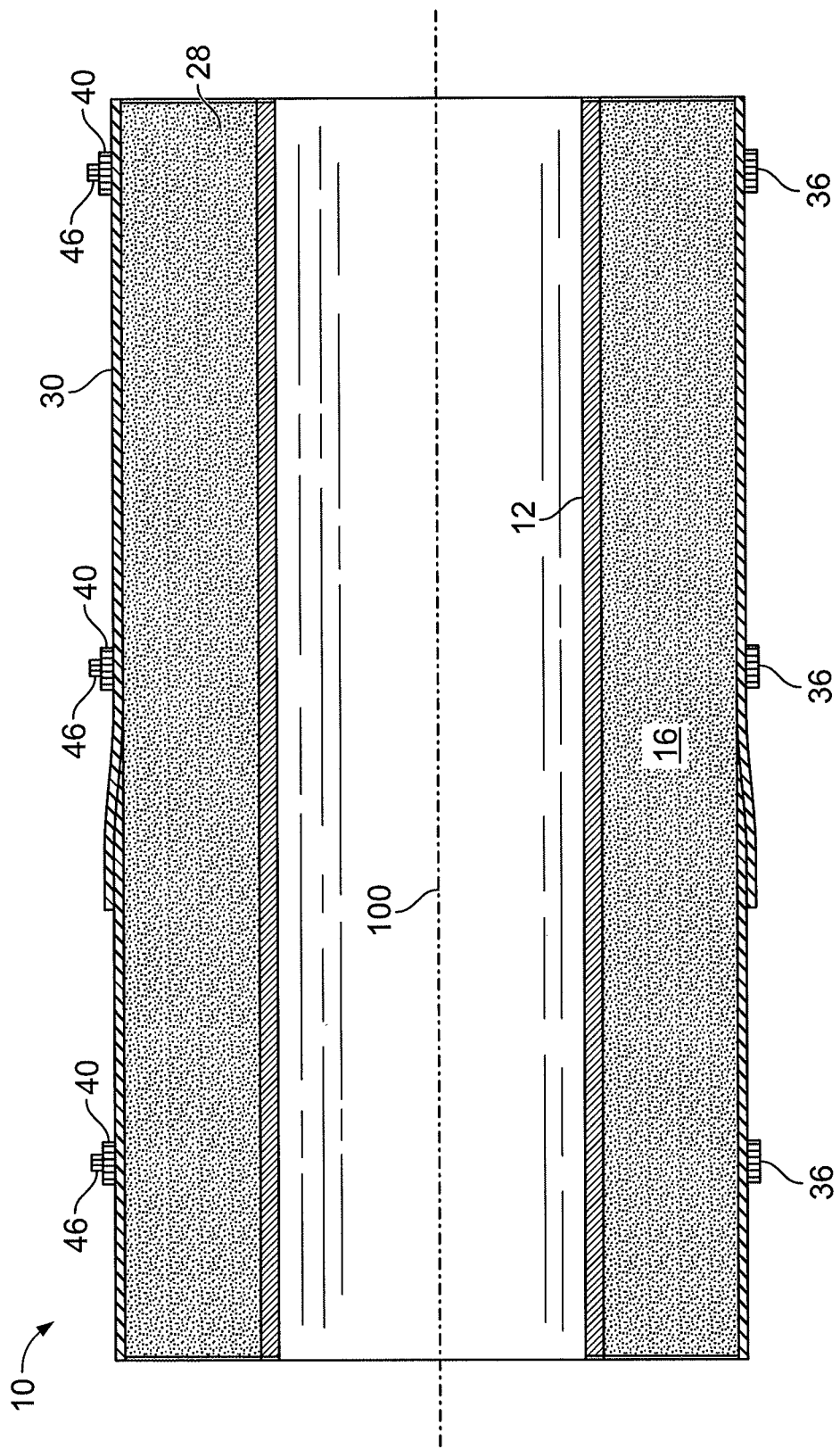
FIG. 4 is a longitudinal cross-sectional view shown schematically of an insulation system including a retaining band.

A stainless steel jacket 30 is disposed about the insulation 14, preferably along an entire length of the insulation 14 and/or service pipe 12, although the jacket 30, the insulation 14, and the service pipe 12 are typically segments (see, e.g., FIG. 4). The jacket 30 is generally produced from a stainless steel sheet wrapped around the insulation 14 wherein end portions 32a,b overlap forming a joint or lapping area 34. The jacket 30 is preferably produced from a 22 gauge metal sheet about 0.0299 ins (0.759 mm) thick plus/minus some manufacturing tolerance.

The jacket 30 is maintained about the insulation 14 by a retaining band 36. The retaining band 36 is provided to secure insulation jackets 30 during a blast test during a LOCA in a nuclear power plant. The band 36 serves to stabilize the jacket 30 and prevent the joint 34 from opening.

The retaining band 36 has a length significantly shorter than a length of a jacket segment. Accordingly, a plurality of retaining bands 36 may be employed in spaced relationship along a given length of a single jacket 30 (see FIG. 4). Stated another way, each length of jacket 30 will have 2 or more retaining bands 36 to hold the jacket 30 in place. Each retaining band 36 is separated from an adjacent retaining band by a space.

The retaining band 36 is generally produced from a stainless steel strip formed into a circumferential band. The stainless steel strip is preferably produced from a 16 gauge stainless steel sheet about 0.0598 ins (1.52 mm) thick plus/minus some manufacturing tolerance.

Each retaining band 36 has a coupler 40, preferably a buckle or tension latch as illustrated in the figures. The coupler 40 draws the opposing ends 44a,b of the band 36 together to form a circumferential structure having a band joint or lapping area located radially inwardly of the coupler 40. A center point of the retaining band joint 44 is preferably located a preselected number of degrees from a center point of the jacket joint 34. The spacing of these respective center points is generally greater than 30 degrees and less than 330 degrees, preferably between 90 degrees and 270 degrees, more preferably 120 degrees and 240 degrees, and most preferably between 150 degrees and 210 degrees, or any range or combination of ranges therein. This spacing positions the coupler 40 at a remote location from the jacket seam or joint 34.

The tension latch shown in the figures includes a handle 46 pivotable about a pin, a rivet or opposing rivets 48 located on a base 50. The base 50 is fixedly attached to one of the opposing ends 44a, preferably by a weld.

An adjustable length hook 52 capable of reciprocal movement upon pivoting of the handle 46 is pivotally joined to the handle 46 by a pin 53, a rivet or rivets. The hook 52 is joined to the handle 46 such that rotation of the handle about the rivet 48 results in a cam action extending the hook 52 outwardly relative to the base 50 on counterclockwise rotation of the handle 46 and drawing the hook back inwardly relative to the base 50 upon clockwise rotation of the handle 46. The length of the hook 52 is adjustable through rotation of a nut 54.

The tension latch also includes a keeper 56 fixedly attached to the opposing end 44b of the band one of the opposing ends 44b of the band 36. The keeper 56 receives a portion of the hook 52 to draw the retaining band 36 about the jacket 30.

The tension latch may also include a secondary catch 58 which ensures that the handle 46 cannot be inadvertently rotated counterclockwise to release the hook 52 from the keeper 56. The secondary catch 58 is attached to the hook 52 and extends upwardly through an aperture in the handle 46. The catch 58 engages a top surface of the handle about the aperture and must be flexed to disengage it from the top surface so that the catch 58 may pass through the aperture on counterclockwise rotation of the handle 46.

The retaining band 36 further has a gripping device 60 that secures the opposing ends 32a,b of the jacket 30 within the circumferential confines of the retaining band 36 and approximately opposite the coupler 40. A portion of the jacket joint or seam 34 is formed within the gripping device 60.

Figure 5:
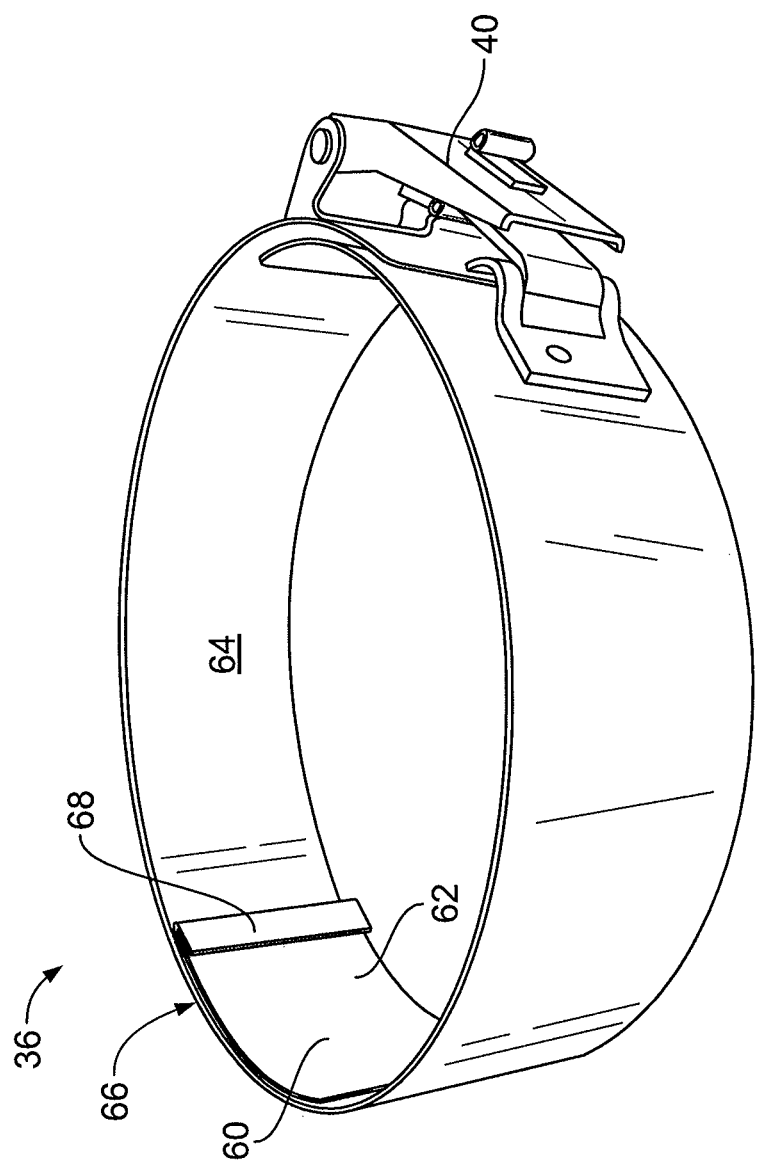
FIG. 5 is a perspective view a retaining band for an insulation system.
Figure 6:
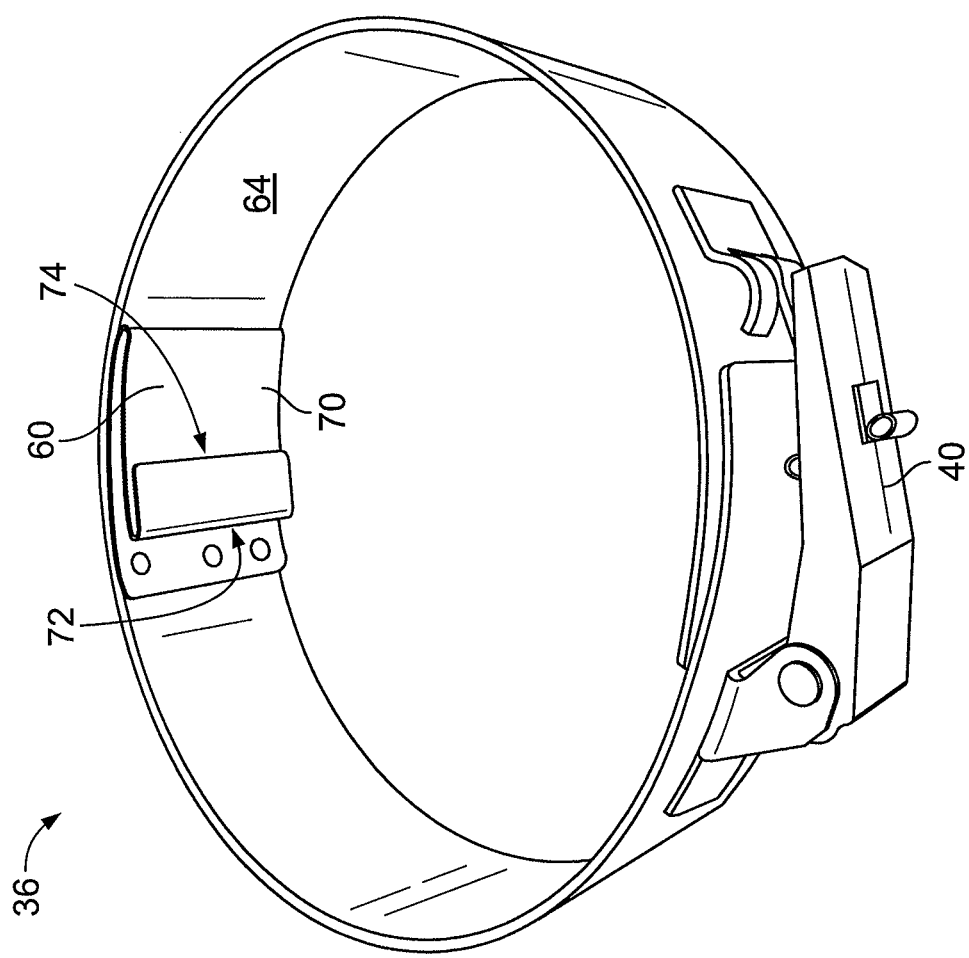
FIG. 6 is a perspective view of a retaining band for an insulation system.
Figure 7:
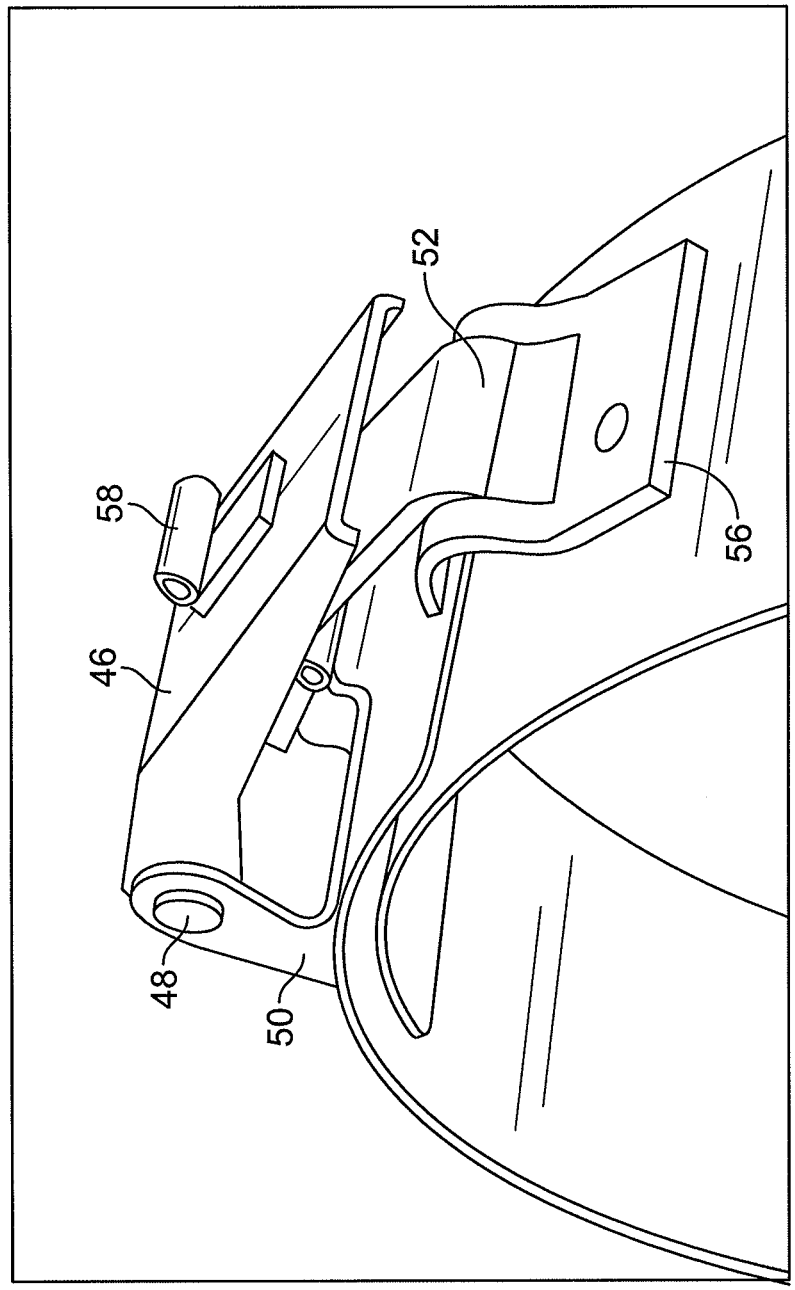
FIG. 7 is a perspective view of a latch assembly.
Figure 8:
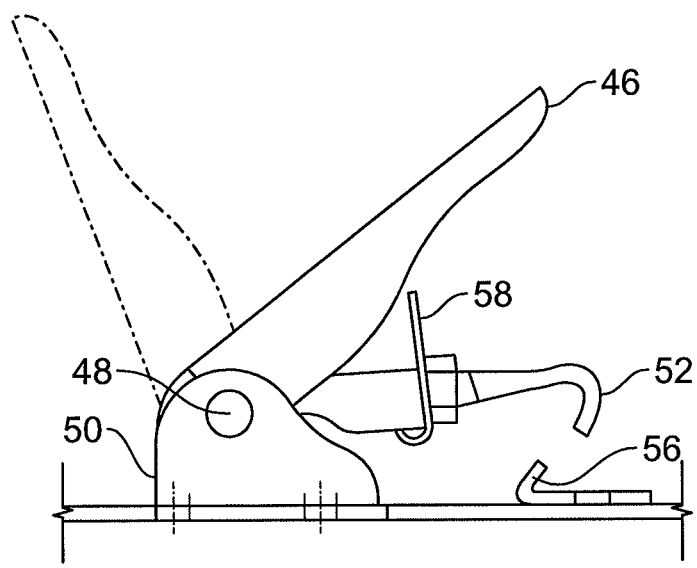
FIG. 8 is a side view of a latch used with a retaining band for an insulation system.
Figure 9:
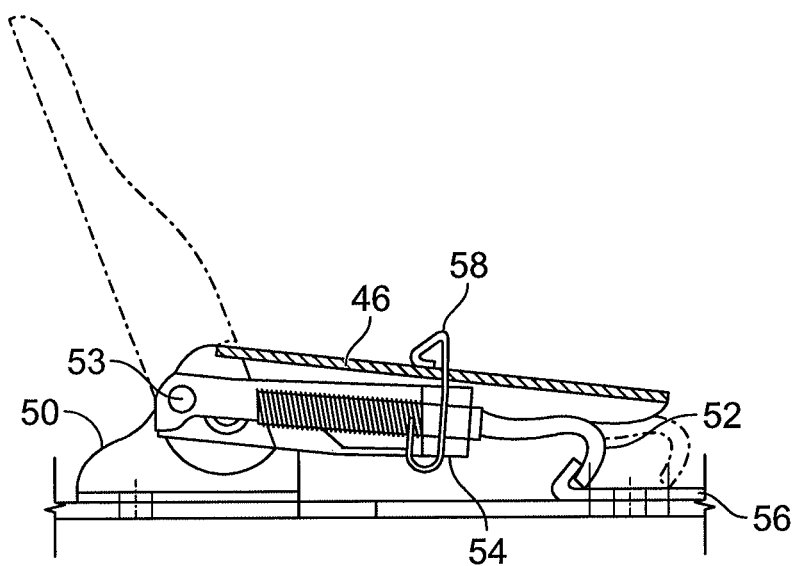
FIG. 9 is a side view of the latch of FIG. 8 with portions removed to reveal a interior of the latch.
Figure 10:
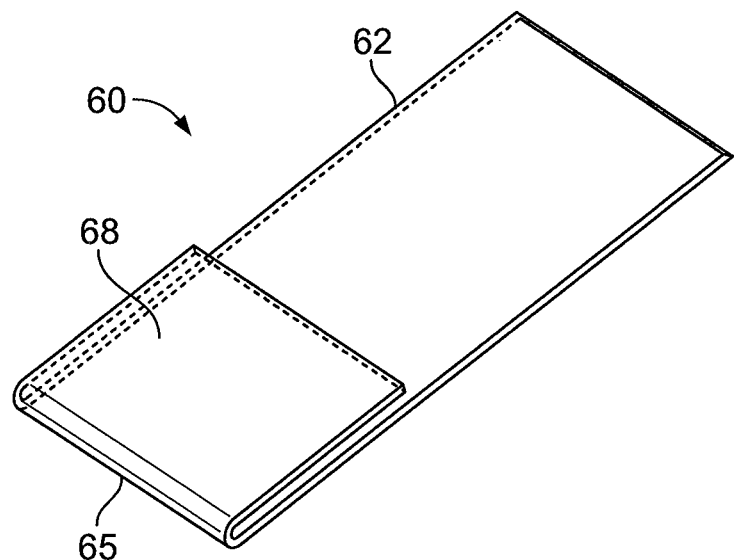
FIG. 10 is a top perspective view of a J- or hook-shaped jacket retaining clip of the retaining band of FIG. 5.
Figure 11:
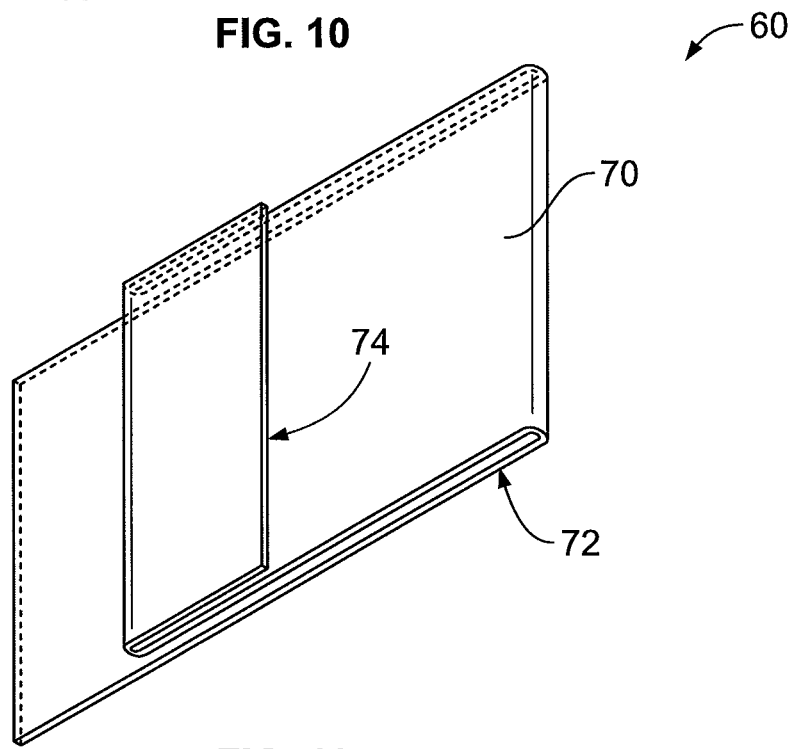
FIG. 11 is a bottom perspective view of an S-shaped jacket retaining clip of the retaining band of FIG. 6.
Figure 12:
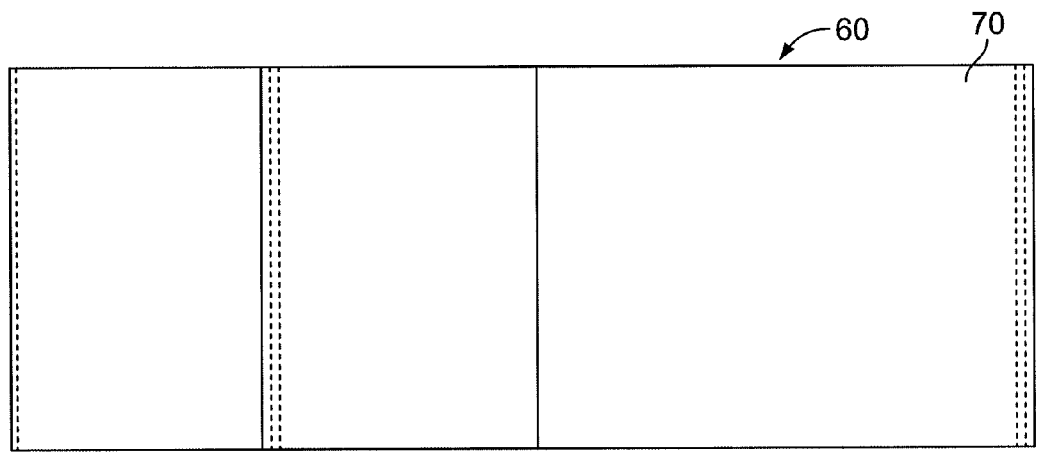
FIG. 12 is a bottom plan view of the clip of FIG. 11.
Figure 13:
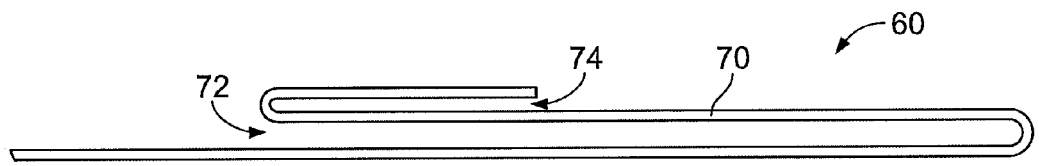
FIG. 13 is a side plan view of the clip of FIG. 11.

One embodiment of the gripping device 60 is illustrated in FIGS. 5 and 10. Here, the gripping device 60 is a substantially J- or hook-shaped clip 62. The clip 62 is fixedly attached to a radially inner surface 64 of the retaining band 36. Accordingly, the clip 62 extends radially inwardly from the inner wall 64. One leg of the clip 62 follows the contour of the inner surface 64 of the band 36, substantially matching its radius of curvature, and terminating at a bend 65. This forms a pocket 66 between the inner surface 64 of the band 36 and a surface of the clip 62. The pocket 66 is adapted, as in dimensioned, to receive one end 32a of the jacket 30. The opposing end of the jacket 32b is received within a second pocket located in the hook portion 68 of the clip 62.

Another embodiment of the gripping device 60 is illustrated in FIGS. 1, 6, and 11-13. In this embodiment, the gripping device 60 is an S-shaped clip 70. The clip 70 is fixedly attached to the radially inner surface 64 of the retaining band 36. One leg of the clip 70 follows the contour of the inner surface 64 of the band 36, substantially matching its radius of curvature terminating at a bend. The bend directs the clip 70 radially inwardly and in an opposite direction, such that a first pocket 72 is formed between facing surfaces of the clip 70. A second leg extends from the bend, terminating at a second bend. The second bend directs the clip radially inwardly and again in an opposite direction, such that a second pocket 74 is formed between facing surfaces of the clip 70. The first and second pockets 72,74 are each dimensioned to receive an end 32a,b of the jacket (see FIG. 1).

The terms "first," "second," "upper," "lower," "front," "back," etc. are used for illustrative purposes only and are not intended to limit the embodiments in any way. The term "plurality" as used herein is intended to indicate any number greater than one, either disjunctively or conjunctively as necessary, up to an infinite number. The terms "attached," "joined" and "connected" as used herein are intended to put or bring two elements together so as to form a unit, and any number of elements, devices, fasteners, etc. may be provided between the joined or connected elements unless otherwise specified by the use of the term "directly" and supported by the drawings. The term "radially" as used herein is used in relation to an imaginary longitudinal axis 100 located at a center of the insulation system and extending along the length thereof. Thus, as one moves radially inwardly, it moves closer to the imaginary center axis.

Many modifications and variations of the present invention are possible in light of the above teachings. It is, therefore, to be understood within the scope of the appended claims the invention may be protected otherwise than as specifically described.

What is claimed is:

1. A retaining band for securing a metal jacket about an insulation, the retaining band comprising:
   a metal strip having opposing first and second ends and formed into a circumferential structure such that the first and second ends are drawn together;
   a coupler for securing the first and second ends to form the circumferential structure; and
   a clip for retaining an edge portion of the metal jacket therein and located along a radially inner wall of the circumferential structure.

2. The retaining band of claim 1 wherein the clip is fixedly attached to the radially inner wall of the circumferential structure.

3. The retaining band of claim 2 wherein the clip extends radially inwardly relative to the inner wall of the circumferential structure.

4. The retaining band of claim 3 wherein the clip is fixedly attached to the inner wall of the circumferential structure.

5. The retaining band of claim 4 wherein the clip comprises a first leg extending along the radially inner surface of the circumferential retaining band and terminating at a first bend which directs the clip radially inwardly and in an opposite direction to form a first pocket adapted for receiving a first edge of an end portion of the metal jacket.

6. The retaining band of claim 5 wherein the clip comprises a second leg extending from the first bend in a direction opposite the first leg and terminating at a second bend which directs the clip radially inwardly and in an opposite direction to form a second pocket adapted for receiving a second edge of an opposing end portion of the metal jacket.

7. The retaining band of claim 2 wherein the coupler is a tension latch.

8. The retaining band of claim 2 wherein the clip is hook-shaped.

9. The retaining band of claim 2 wherein the clip is S-shaped.

10. An insulation system comprising:
a pipe insulation;
a metal jacket disposed about the pipe insulation having opposing free ends;
a circumferential retaining band disposed about the metal jacket and having a longitudinal length substantially less than a corresponding length of the metal jacket, the circumferential retaining band including a coupler joining a first end of the circumferential retaining band to an opposing second end of the circumferential retaining band and a clip spaced from the coupler along a radially inner surface of the retaining band wherein the clip is adapted to secure the opposing free ends of the metal jacket.

11. The insulation system of claim 10 wherein the clip is fixedly attached to the radially inner surface of the circumferential retaining band.

12. The insulation system of claim 11 wherein the clip comprises a first leg extending along the radially inner surface of the circumferential retaining band and terminating at a first bend which directs the clip radially inwardly and in an opposite direction to form a first pocket wherein one of the opposing ends of the metal jacket is inserted within the first pocket.

13. The insulation system of claim 12 wherein the clip comprises a second leg extending from the first bend in a direction opposite the first leg and terminating at a second bend which directs the clip radially inwardly and in an opposite direction to form a second pocket wherein one of the opposing ends of the metal jacket is inserted within the second pocket.

14. The insulation system of claim 10 wherein the clip is spaced from the coupler between 30 and 330 degrees.

15. The insulation system of claim 10 wherein the clip is spaced from the coupler between 90 and 270 degrees.

16. The insulation system of claim 10 wherein the clip is spaced from the coupler between 120 and 240 degrees.

17. The insulation system of claim 10 wherein the clip is spaced from the coupler between 150 and 210 degrees.

18. The insulation system of claim 10 wherein the coupler is a tension latch.

19. The insulation system of claim 10 wherein the clip is hook-shaped.

20. The insulation system of claim 10 wherein the clip is S-shaped.

* * * * *